(12) United States Patent
Ohsawa

(10) Patent No.: US 11,981,791 B2
(45) Date of Patent: *May 14, 2024

(54) METHOD OF MANUFACTURING RUBBER PRODUCT

(71) Applicant: BRIDGESTONE CORPORATION, Tokyo (JP)

(72) Inventor: Yasuo Ohsawa, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 387 days.

This patent is subject to a terminal disclaimer.

(21) Appl. No.: 17/612,314

(22) PCT Filed: Nov. 26, 2019

(86) PCT No.: PCT/JP2019/046196
§ 371 (c)(1),
(2) Date: Nov. 18, 2021

(87) PCT Pub. No.: WO2020/255442
PCT Pub. Date: Dec. 24, 2020

(65) Prior Publication Data
US 2022/0227960 A1    Jul. 21, 2022

(30) Foreign Application Priority Data

Jun. 17, 2019 (JP) ................. 2019-112255

(51) Int. Cl.
*C08K 3/22* (2006.01)
*B29C 64/153* (2017.01)
(Continued)

(52) U.S. Cl.
CPC .............. *C08K 3/22* (2013.01); *B29C 64/153* (2017.08); *B29K 2019/00* (2013.01);
(Continued)

(58) Field of Classification Search
CPC . B29C 35/02; B29C 65/4875; B29C 65/4865; B29C 64/20; B29C 64/153
See application file for complete search history.

(56) References Cited

U.S. PATENT DOCUMENTS

2020/0181433 A1    6/2020  Yoshinaga et al.
2020/0229538 A1    7/2020  Yoshinaga et al.

FOREIGN PATENT DOCUMENTS

CN        107936532 A        4/2018
DE    10 2016 203 885 A1     9/2017
(Continued)

OTHER PUBLICATIONS

Dec. 21, 2021 International Preliminary Report on Patentability issued in Patent Application No. PCT/JP2019/046196.
(Continued)

*Primary Examiner* — Stella K Yi
(74) *Attorney, Agent, or Firm* — Oliff PLC

(57) ABSTRACT

A method of manufacturing a rubber product by bonding thin pieces on a manufacturing table includes an adhesion prevention treatment step of treating uncrosslinked rubber powder to prevent mutual adhesion, a first raw rubber powder supply step of supplying raw rubber powder, treated for adhesion prevention, onto the surface of the manufacturing table, a first crosslinking step of irradiating with an electron beam to crosslink the irradiated portion, a post-treatment step of aligning the surface of the crosslinked portion with the surface of the manufacturing table, a second raw rubber powder supply step of supplying the raw rubber powder onto the surface of the manufacturing table, including the surface of the crosslinked portion, and a second crosslinking step of irradiating with an electron beam to crosslink the irradiated portion. The post-treatment, second (Continued)

raw rubber powder supply, and second crosslinking steps are sequentially repeated to bond the thin pieces.

4 Claims, 13 Drawing Sheets

(51) Int. Cl.
    *B29K 19/00*     (2006.01)
    *B33Y 10/00*     (2015.01)
    *B33Y 70/10*     (2020.01)

(52) U.S. Cl.
    CPC ............... *B33Y 10/00* (2014.12); *B33Y 70/10* (2020.01); *C08K 2003/2206* (2013.01)

(56) References Cited

FOREIGN PATENT DOCUMENTS

| JP | 2004-107514 A | 4/2004 |
|----|---------------|--------|
| JP | 2011-184532 A | 9/2011 |
| JP | 2019-019324 A | 2/2019 |
| WO | 2017/208979 A1 | 12/2017 |
| WO | 2019/035387 A1 | 2/2019 |

OTHER PUBLICATIONS

Jan. 21, 2020 International Search Report issued in International Patent Application No. PCT/JP2019/046196.
May 31, 2023 Extended European Search Report issued in European Patent Application No. 19933480.6.

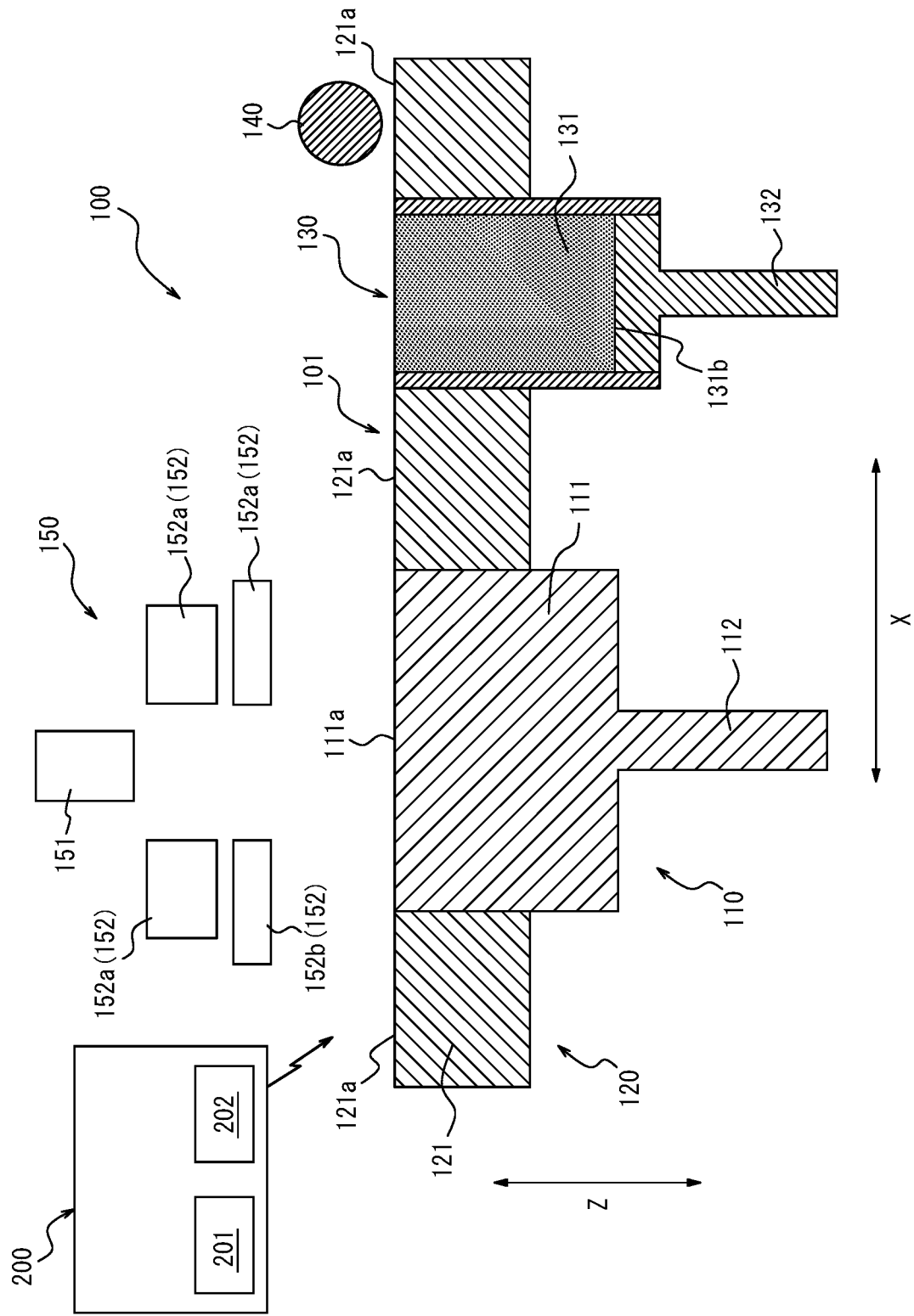

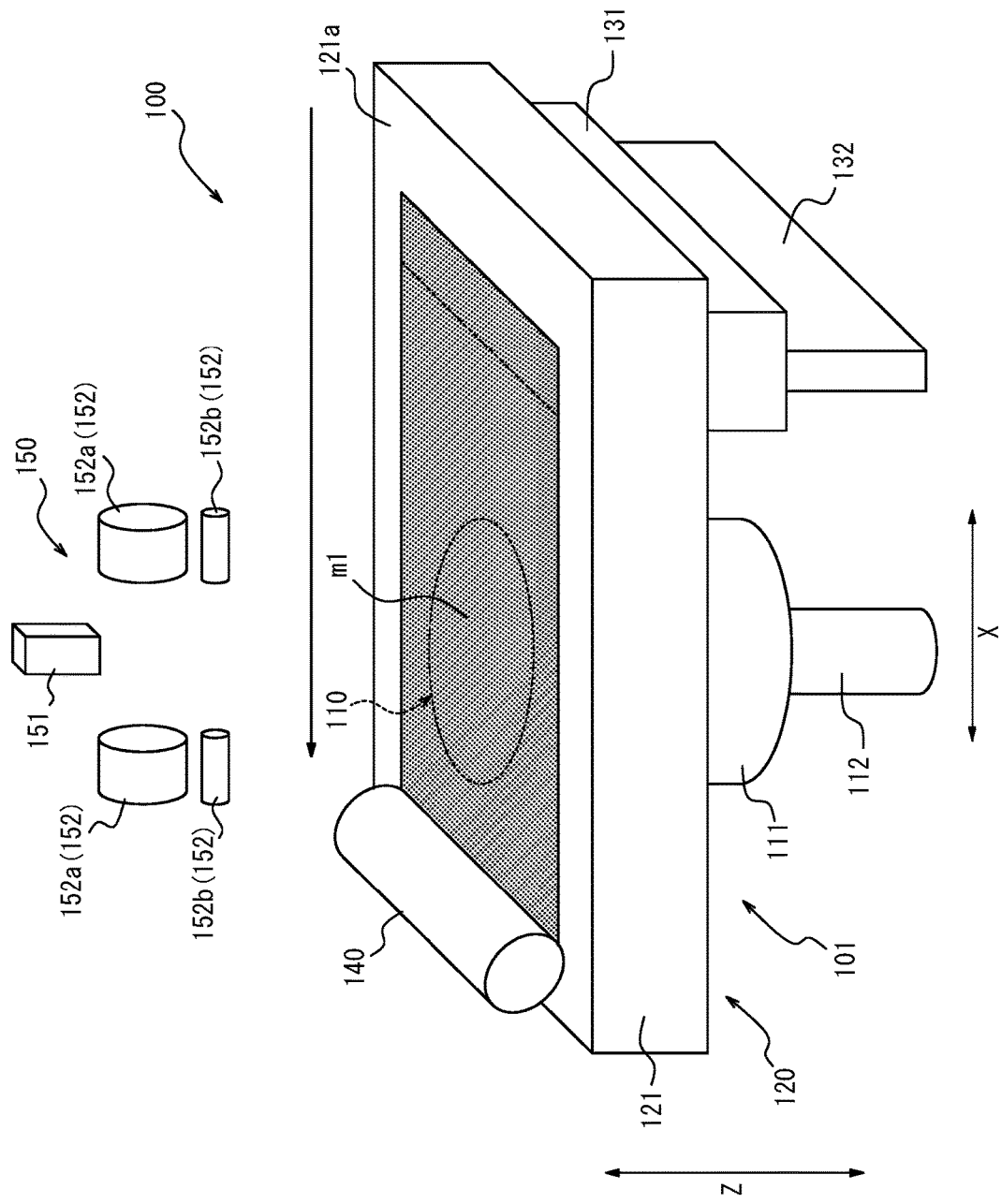

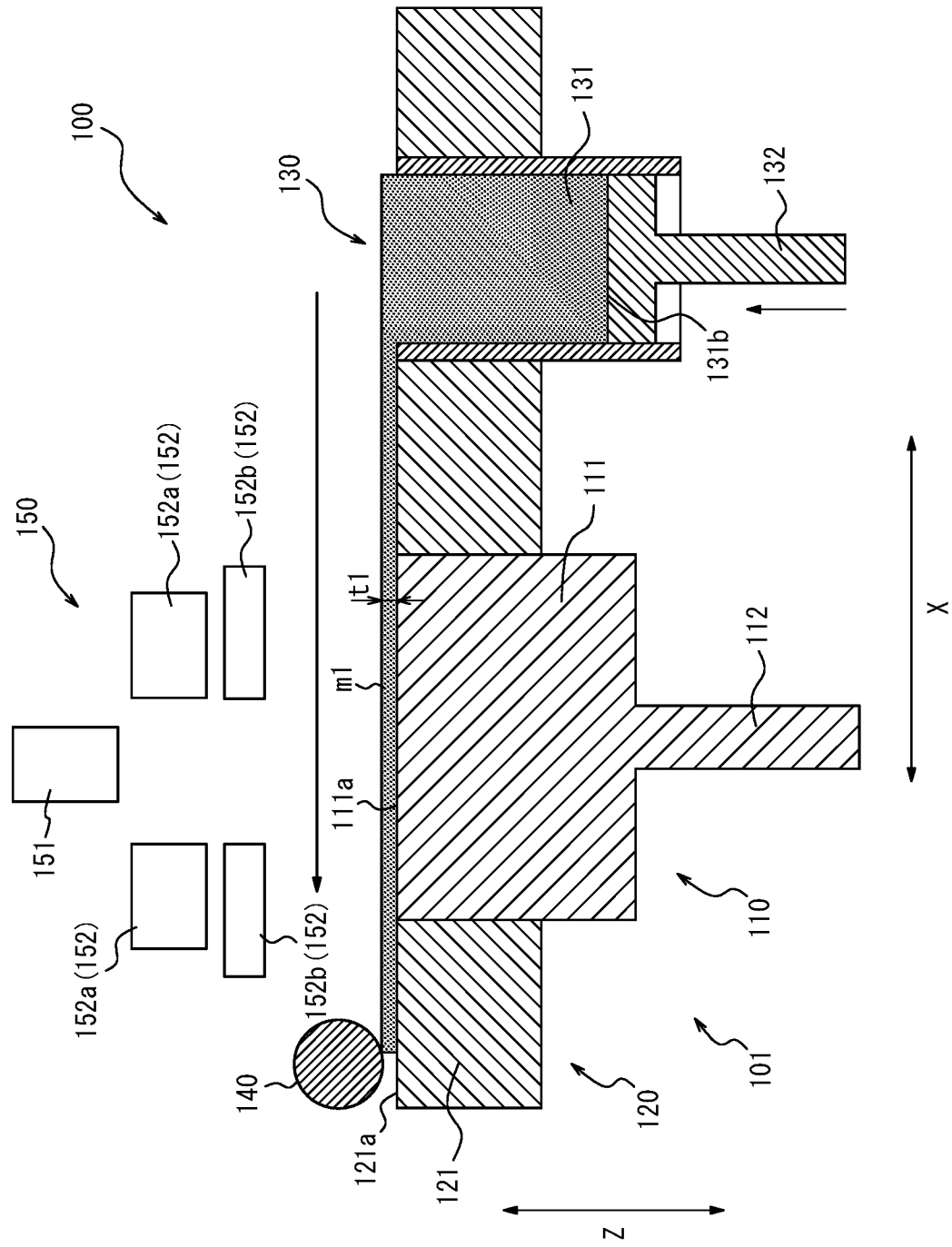

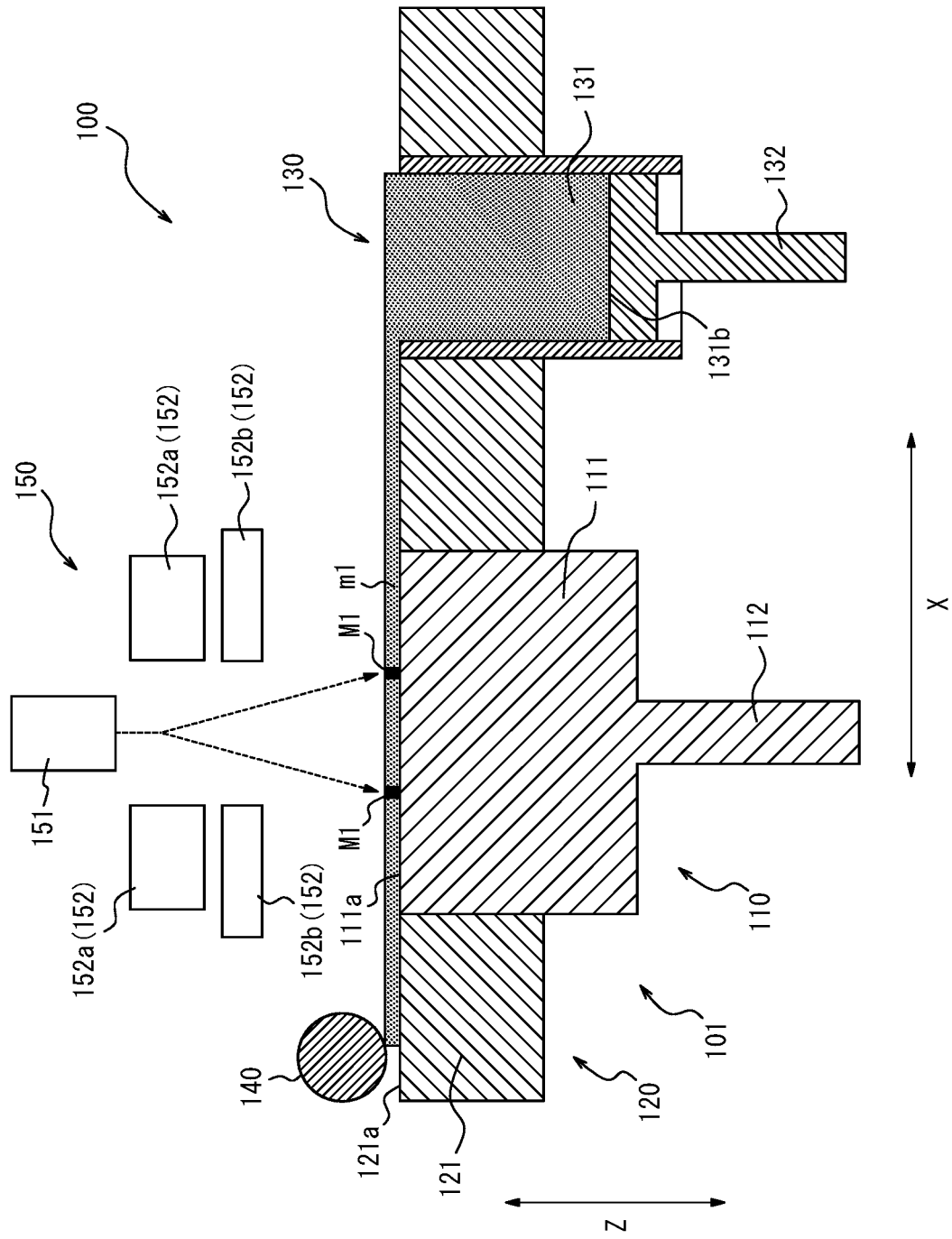

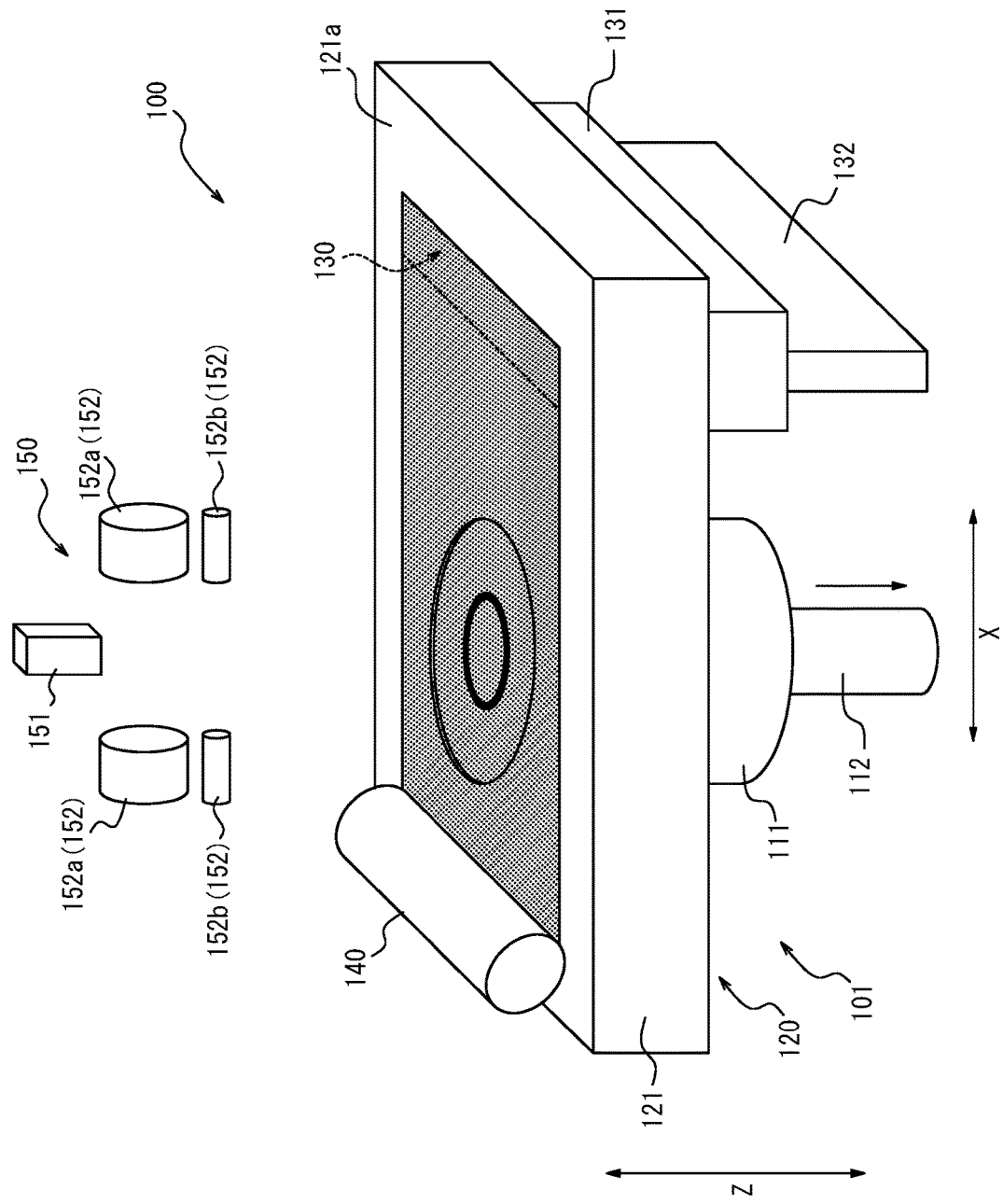

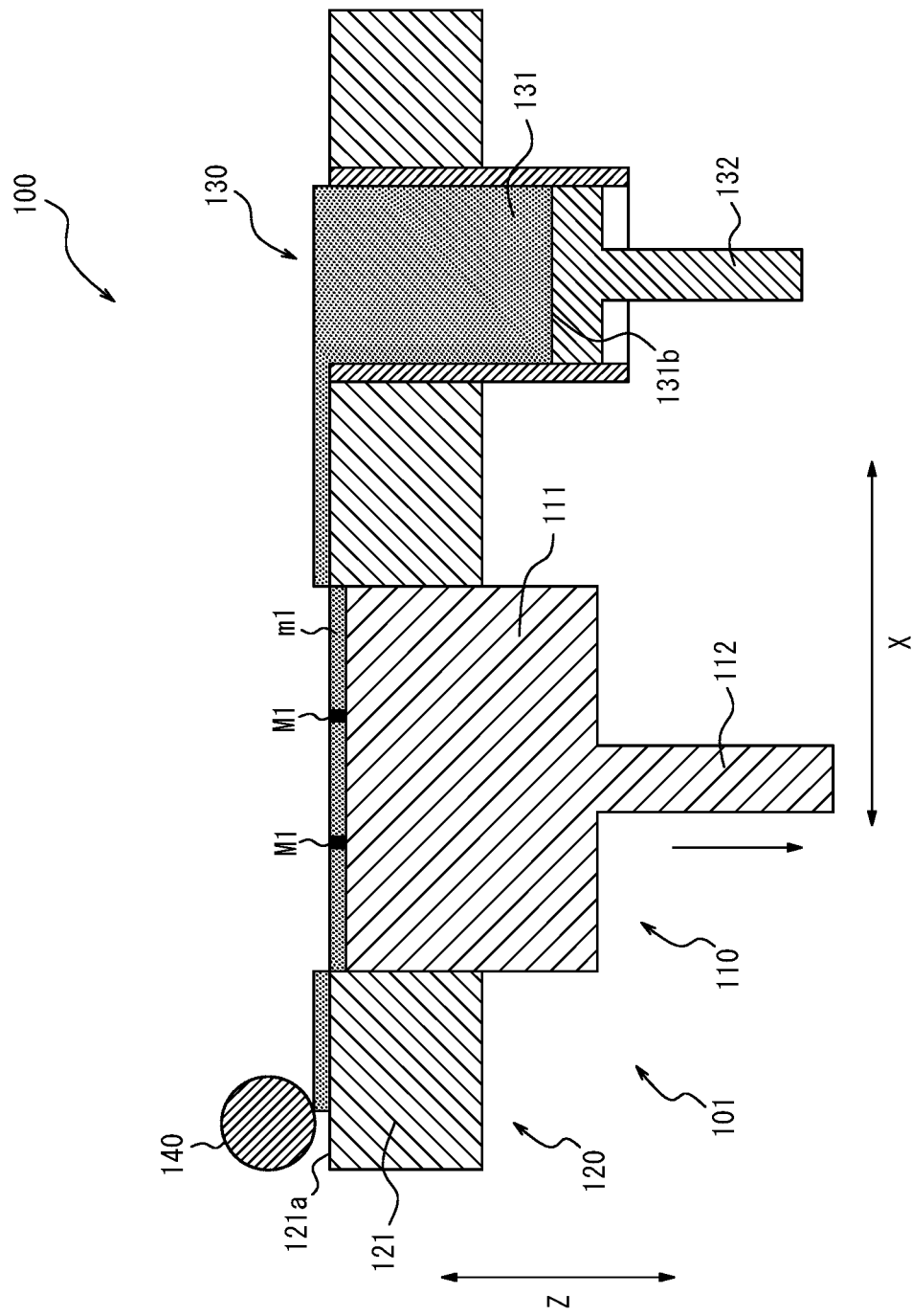

METHOD OF MANUFACTURING RUBBER PRODUCT

TECHNICAL FIELD

The present disclosure relates to a method of manufacturing a rubber product, and in particular to a method suitable for manufacturing rubber products that can flexibly respond to changes in the shape of the products.

The present application claims priority to Japanese Patent Application No. 2019-112255 filed on Jun. 17, 2019, the entire contents of which are incorporated herein by reference.

BACKGROUND

Known methods of manufacturing rubber products include a method of manufacturing a product by placing unvulcanized rubber in a mold that matches the shape of the product and vulcanizing the rubber by applying heat and pressure, as in Patent Literature (PTL) 1, and a method of placing unvulcanized rubber in a mold that is larger than the product, vulcanizing the rubber by applying heat and pressure, and then machining the rubber by cutting or the like to yield the shape of the product.

CITATION LIST

Patent Literature

PTL 1: JP2004-107514A

SUMMARY

Technical Problem

However, in the method of using a mold that matches the shape of the product, the mold needs to be modified or made anew when a change in the shape of the product occurs for a reason such as a change in product specifications. The production costs and the time and effort for processing have thus been problematic. Furthermore, in a method of using a mold larger than the product, there has been room for improvement in the manufacturing accuracy, such as dimensional accuracy during machining, depending on the physical properties of the rubber.

It is an aim of the present disclosure to provide a method of manufacturing a rubber product that can flexibly respond to changes in the shape of a product and can achieve high manufacturing accuracy.

Solution to Problem

We carefully studied how to solve the aforementioned problem and concluded that a desired product shape can be obtained without using a mold by considering the shape of the desired product as a laminated body of thin pieces yielded when cutting on a number of planes orthogonal to a predetermined axis, and by then stacking and bonding the thin pieces together to manufacture the product. After further investigating the aforementioned additive manufacturing, we discovered that the additive manufacturing can be applied to rubber products by performing appropriate treatment on the powder of uncrosslinked rubber to be used as a material and further crosslinking the powder of the uncrosslinked rubber, thereby completing the present disclosure.

We provide the following.

A method of manufacturing a rubber product according to the present disclosure is a method of manufacturing a rubber product by bonding a plurality of thin pieces on a manufacturing table, the method including:

- an adhesion prevention treatment step of treating uncrosslinked rubber powder, which is a material of the rubber product, to prevent mutual adhesion of the uncrosslinked rubber powder;
- a first raw rubber powder supply step of supplying raw rubber powder, on which the adhesion prevention treatment has been performed, onto a surface of the manufacturing table uniformly in a layer of a thickness corresponding to a thin piece;
- a first crosslinking step of irradiating a portion of the layer of raw rubber powder with an electron beam according to a shape corresponding to the thin piece to crosslink the portion that is irradiated;
- a post-treatment step of adjusting relative positions of a surface of a crosslinked portion in the layer of raw rubber powder and a surface of the manufacturing table to align the surface of the crosslinked portion with the surface of the manufacturing table;
- a second raw rubber powder supply step of supplying the raw rubber powder onto the surface of the manufacturing table, including the surface of the crosslinked portion, uniformly in a layer of a thickness corresponding to a next thin piece to be stacked on the thin piece; and
- a second crosslinking step of irradiating a portion of the layer of raw rubber powder with an electron beam according to a shape corresponding to the next thin piece to crosslink the portion that is irradiated;
- wherein the post-treatment step, the second raw rubber powder supply step, and the second crosslinking step are sequentially repeated to bond the plurality of thin pieces together.

Advantageous Effect

According to the present disclosure, a method of manufacturing a rubber product that, without use of a mold, can flexibly respond to changes in the shape of a product and can achieve high manufacturing accuracy can be provided.

BRIEF DESCRIPTION OF THE DRAWINGS

In the accompanying drawings:

FIG. 4B is a cross-sectional view schematically illustrating the configuration of the additive manufacturing apparatus;

FIG. 5A is a perspective view schematically illustrating a first raw rubber powder supply process;

FIG. 5B is a cross-sectional view schematically illustrating a first raw rubber powder supply process;

FIG. 6B is a cross-sectional view schematically illustrating a first cross-linking process;

FIG. 7A is a perspective view schematically illustrating a post-treatment process;

FIG. 7B is a cross-sectional view schematically illustrating a post-treatment process;

DETAILED DESCRIPTION

Figure 1:
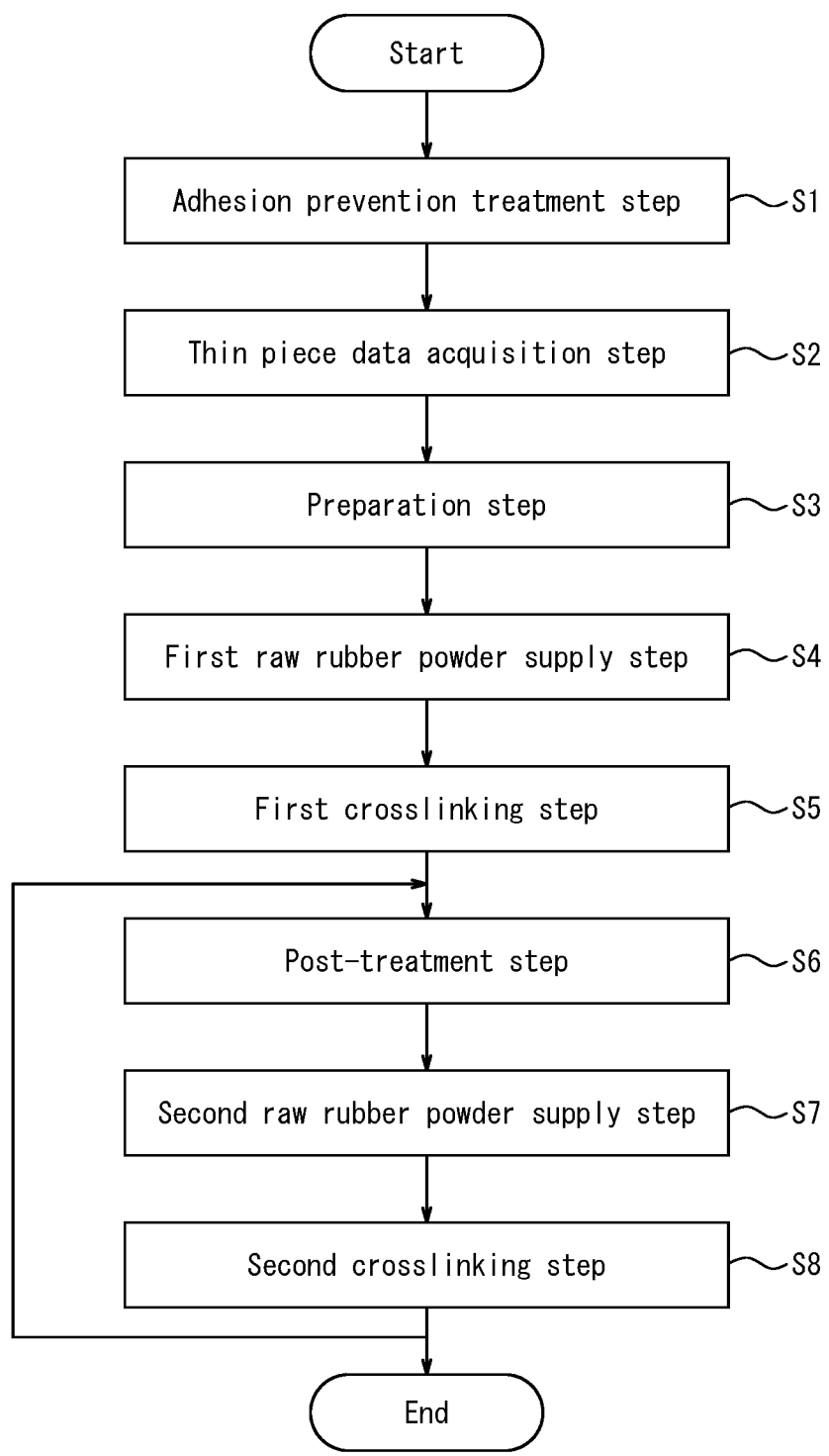
FIG. 1 is a flowchart illustrating an outline of a method of manufacturing a rubber product according to an embodiment of the present disclosure.

Methods of manufacturing rubber products according to embodiments of the present disclosure are described below. FIG. 1 is a flowchart illustrating an outline of a method of manufacturing a rubber product according to an embodiment of the present disclosure.

As illustrated in FIG. 1, the method of manufacturing a rubber product according to the present disclosure is a method of manufacturing a rubber product by bonding a plurality of thin pieces on a manufacturing table, and as illustrated in FIG. 1, the method includes treating uncrosslinked rubber powder, which is a material of the rubber product, to prevent mutual adhesion of the uncrosslinked rubber powder (an adhesion prevention treatment step S1), acquiring data on a plurality of thin pieces of the rubber product (thin piece data acquisition step S2), setting a manufacturing table to a state in which manufacturing can start (preparation step S3), supplying raw rubber powder, on which the adhesion prevention treatment has been performed, onto a surface of the manufacturing table uniformly in a layer of a thickness corresponding to a thin piece (first raw rubber powder supply step S4), irradiating the raw rubber powder layer with an electron beam according to a shape corresponding to the thin piece to crosslink the irradiated portion (first crosslinking step S5), adjusting relative positions of a surface of a crosslinked portion in the raw rubber powder layer and a surface of the manufacturing table to align the surface of the crosslinked portion with the surface of the manufacturing table (post-treatment step S6), supplying the raw rubber powder onto the surface of the crosslinked portion uniformly in a layer of a thickness corresponding to the next thin piece to be stacked on the thin piece (second raw rubber powder supply step S7), and irradiating the raw rubber powder layer with an electron beam according to a shape corresponding to the next thin piece to crosslink the irradiated portion (second crosslinking step S8). The post-treatment step S6, the second raw rubber powder supply step S7, and the second crosslinking step S8 are sequentially repeated to bond the plurality of thin pieces together and manufacture the rubber product.

Figure 2:
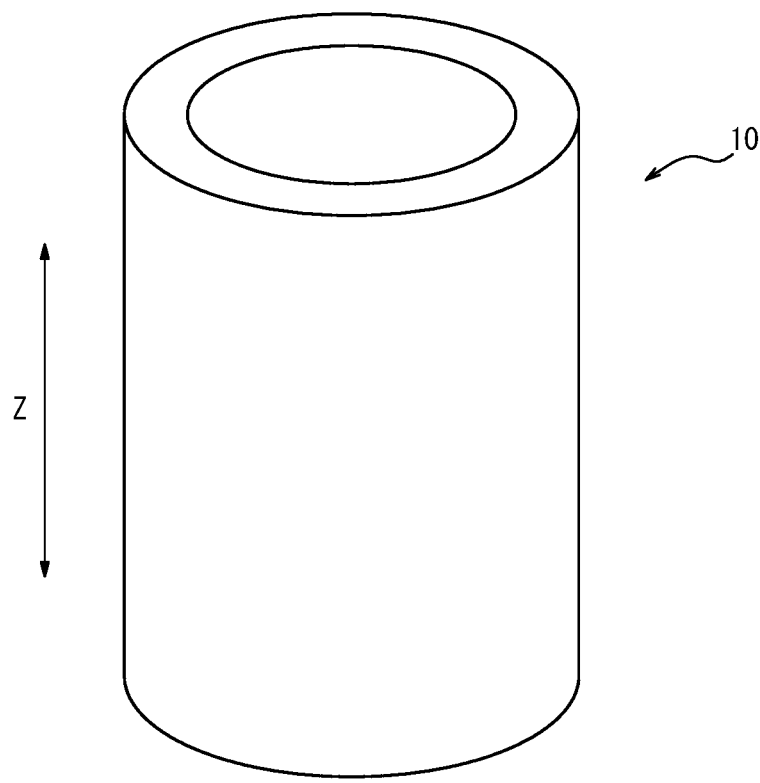
FIG. 2 is a diagram illustrating an example of a rubber product manufactured by the method of manufacturing a rubber product according to an embodiment of the present disclosure.

FIG. 2 illustrates a rubber product 10, which is an example of a rubber product to be manufactured by the method of manufacturing a rubber product according to the present embodiment. As illustrated in FIG. 2, the rubber product 10 can, for example, have a cylindrical shape.

Here, thin pieces refer to layers that are divided by cutting at numerous planes orthogonal to the axis along the stacking direction of the rubber product to be manufactured.

Figure 3:
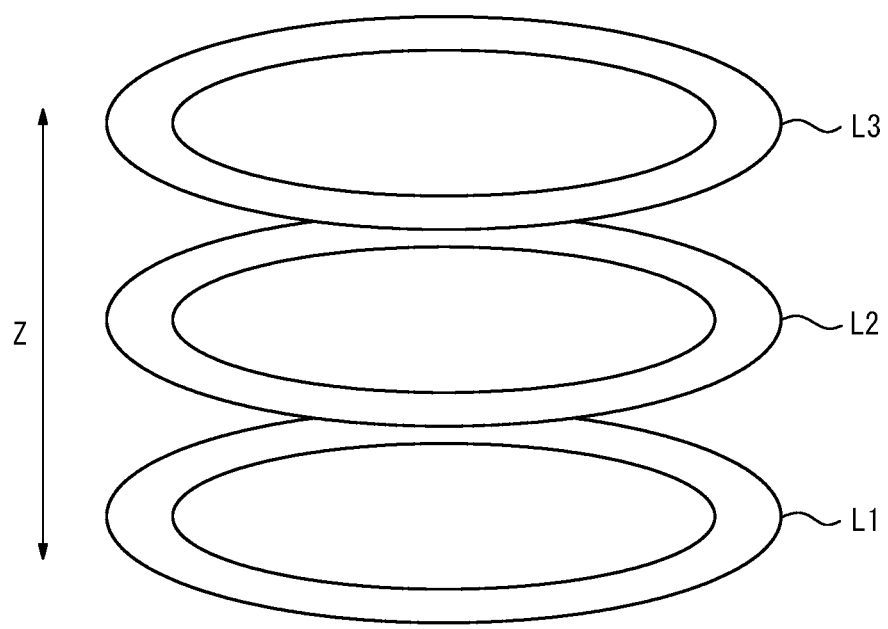
FIG. 3 is a diagram illustrating thin pieces.

In the example of the rubber product 10, when the Z-axis direction is the stacking direction (height), a plurality of sliced layers are formed by cutting the cylindrical three-dimensional shape at numerous planes orthogonal to the Z-axis direction. Each layer in the plurality of sliced layers illustrated in FIG. 3 is a thin piece of the rubber product 10. The stacking direction in additive manufacturing of the rubber product 10 refers to the Z-axis direction in FIGS. 2 and 3, but a suitable direction can be used as the stacking direction according to the shape, size, and the like of the rubber product to be manufactured.

Although the thin pieces L1 to L3 from the first layer to the third layer in the Z-axis direction of the rubber product 10 are illustrated in FIG. 3, the rubber product 10 is actually converted into data on thin pieces L1 to LN (N is a natural number) for the number of layers required to manufacture the rubber product 10.

In this way, the shape of the rubber product 10 is converted into the data on a plurality of thin pieces, and the thin pieces are then stacked and bonded together based on this data to manufacture the rubber product 10.

Each step is described in detail below.

[Adhesion Prevention Treatment Step]

In the adhesion prevention treatment step S1, uncrosslinked rubber powder, which is a material of the rubber product 10, is treated to prevent mutual adhesion of the uncrosslinked rubber powder.

A material suitable for rubber products can be used as the material forming the uncrosslinked rubber powder in the present disclosure. Powders of polyisoprene rubber (IR), styrene-butadiene copolymer rubber (SBR), polybutadiene rubber (BR), ethylene propylene diene rubber (EPDM), chloroprene rubber (CR), halogenated butyl rubber, acrylonitrile butadiene rubber (NBR), and other synthetic rubbers, in addition to natural rubber (NR), can be used as the rubber powder. Among these, powders of natural rubber (NR), styrene-butadiene copolymer rubber (SBR), and polybutadiene rubber (BR) are preferred. These rubber powders may be used alone, or a combination of two or more types thereof may be used.

The uncrosslinked rubber powder may also contain other materials other than natural rubber and synthetic rubber. As the other materials, fillers such as carbon black and silica, softeners, age resistors, zinc oxide, crosslinking accelerators, and the like may be selected as appropriate within a range not detrimental to the aim of the present disclosure. The other materials may be added not only by inclusion in the uncrosslinked rubber powder in advance but also after the treatment to prevent adhesion of the uncrosslinked rubber powder.

Furthermore, as an example of other materials, calcium oxide may be added. By the addition of calcium oxide into the uncrosslinked rubber powder, even when the rubber is heated to a temperature higher than the melting point during the crosslinking of the rubber, bubbles that might be generated in the rubber by heat can be suppressed, and cracks or tears can be prevented from occurring at the areas with bubbles.

The treatment on the uncrosslinked rubber powder to prevent mutual adhesion of the powder refers to the treatment for preventing the powder particles from adhering to each other and is suitably performed by coating the surface of the uncrosslinked rubber powder with an adhesion prevention agent. As the adhesion prevention agent, any of synthetic resin, talc, silica, calcium carbonate, calcium stearate, zinc stearate, carbon black, and the like, for example, or any combination thereof, can be used.

While the means for coating the surface of the uncrosslinked rubber powder with the adhesion prevention agent is not particularly limited, a powdered adhesion prevention agent having a diameter smaller than that of the uncrosslinked rubber powder can be stirred and mixed with the uncrosslinked rubber powder to coat the surface of the uncrosslinked rubber powder, for example. The surface of the uncrosslinked rubber powder may also be coated by applying a dissolved solution or an aqueous dispersion of the adhesion prevention agent to the surface of the uncrosslinked rubber powder. When a dissolved solution or aqueous dispersion of the adhesion prevention agent is used, a coating layer of uniform thickness can easily be formed on the surface of the uncrosslinked rubber powder, but a step of drying the uncrosslinked rubber powder is required after the application. A powdered adhesion prevention agent is preferably used to prevent an increase in the number of production steps.

The adhesion prevention treatment step may be a step included in the preparation of the uncrosslinked rubber powder that becomes the material of the rubber product 10 or may be a separate step performed after the preparation of the uncrosslinked rubber powder.

According to the adhesion prevention treatment step, mutual adhesion of the uncrosslinked rubber powder can be prevented. That is, lumps are not formed due to mutual adhesion of the uncrosslinked rubber powder. This facilitates handling of the uncrosslinked rubber powder. In particular, when the uncrosslinked rubber powder is stored or applied to the additive manufacturing apparatus 100 described below, the manufacturing accuracy of the rubber product can be improved, and the uncrosslinked rubber powder can be easily stored and supplied.

The average diameter of the uncrosslinked rubber powder (raw rubber powder) to which the adhesion prevention treatment is applied is preferably from 1 μm to 500 μm. By the average diameter being 1 μm or more, floating during storage and other times can be suppressed, and the mutual adhesion of the raw rubber powder can more effectively be suppressed. By the average diameter being 500 μm or less, the manufacturing accuracy of the rubber product can be further improved.

In the below-illustrated steps from the preparation step onwards, the raw rubber powder is used to manufacture the rubber product 10. The manufacturing apparatus is not particularly limited as long as the method of manufacturing a rubber product according to the present disclosure can be implemented, but an additive manufacturing apparatus 100 with the following form can, for example, be used.

Figure 4A:
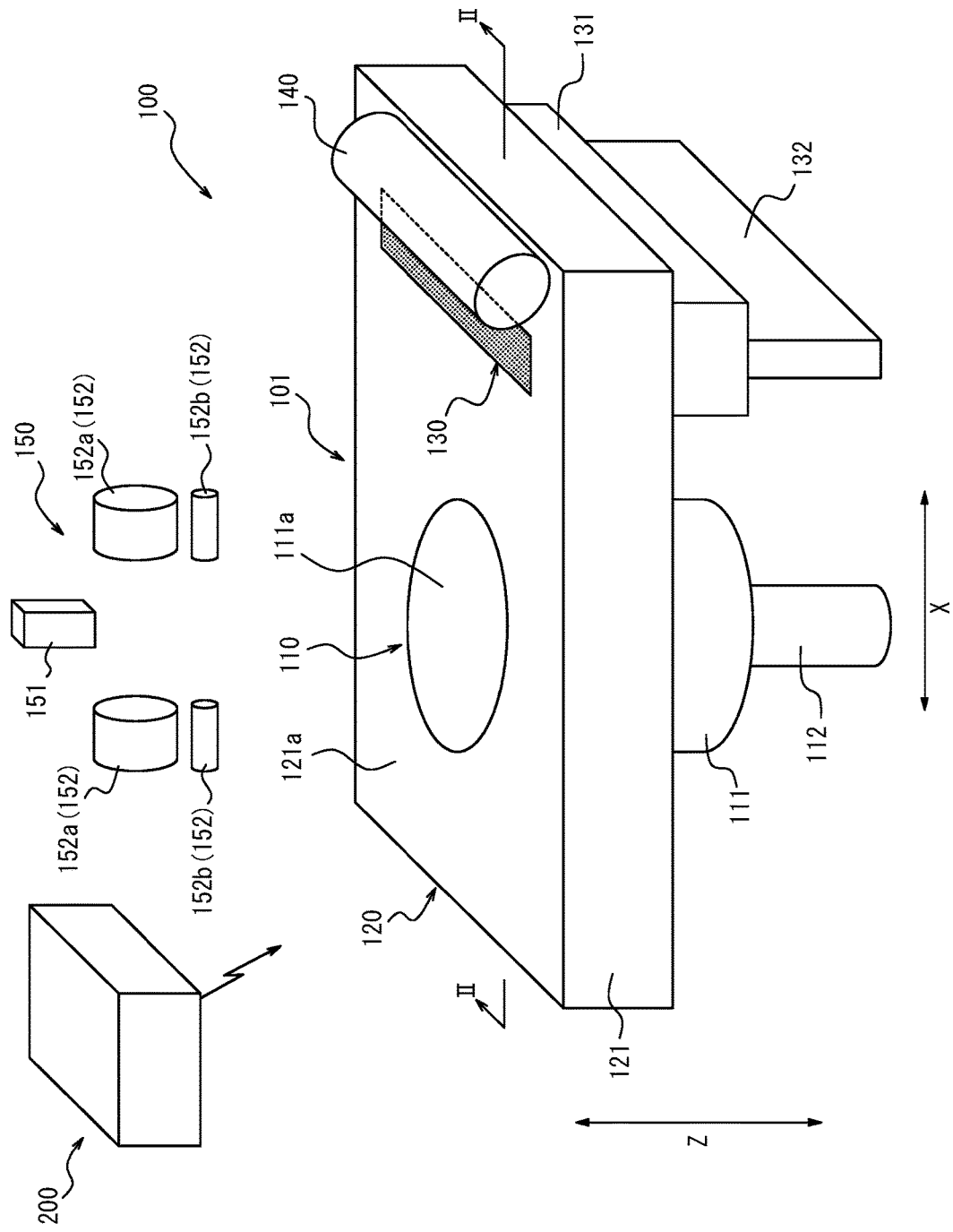
FIG. 4A is a perspective view schematically illustrating the configuration of an additive manufacturing apparatus.

FIG. 4A is a perspective view schematically illustrating the configuration of the additive manufacturing apparatus 100, and FIG. 4B is a cross-sectional view schematically illustrating the configuration of the additive manufacturing apparatus 100. FIG. 4B schematically illustrates a cross-section along line II-II of FIG. 4A.

As illustrated in FIGS. 4A and 4B, the additive manufacturing apparatus 100 includes a manufacturing table 101, a recoater 140, and electron beam irradiation means 150. The manufacturing table 101 includes a manufacturing unit 110, a supply plate 120, and a raw material supplier 130.

The manufacturing unit 110 includes a manufacturing base 111 and a raising/lowering mechanism 112, and the manufacturing base 111 includes a surface 111a for manufacturing rubber products. The manufacturing base 111 has a circular cylinder shape in the illustrated example but may have a polygonal cylinder shape or the like. The manufacturing base 111 can be raised and lowered in the up-down direction (Z-axis direction) by the raising/lowering mechanism 112. The raising/lowering mechanism 112 can, for example, be provided with a piston member using hydraulic pressure or pneumatic pressure, or with a ball screw.

The supply plate 120 is disposed around the manufacturing unit 110 and includes a plate-like portion 121 and a support 122 (not illustrated). The plate-like portion 121 includes a surface 121a onto which raw rubber powder can be supplied. The plate-like portion 121 has a shape in which a part of a plate-like member is perforated according to the outer circumferential shape of the cylindrical manufacturing base 111 in the illustrated example, but the shape is not particularly limited. The support 122 can be any columnar or plate-like shape that supports the plate-like portion 121. The support 122 may be provided with a raising/lowering mechanism, but is not coupled to raising/lowering operations by the raising/lowering mechanism 112 of the manufacturing unit 110.

The raw material supplier 130 has a tank-shaped or box-shaped raw material housing 131, which opens to the surface 121a of the supply plate 120 and extends in the thickness direction (Z-axis direction) of the supply plate 120, and a raising/lowering mechanism 132. The raw material housing 131 can contain raw rubber powder. A bottom portion 131b of the raw material housing 131 can be raised and lowered in the Z-axis direction by the raising/lowering mechanism 132, and the raw rubber powder housed in the raw material housing 131 can be pushed out onto the surface 121a by the raising/lowering operation of the bottom portion 131b. The raising/lowering mechanism 132 can, for example, be a mechanism provided with a piston using hydraulic pressure or pneumatic pressure, or with a ball screw.

The arrangement and configuration of the raw material supplier is not limited to the example of the raw material supplier 130. A configuration may be adopted in which a raw material housing and a nozzle are included, the raw material supplier is arranged at a position (upper side) separated in the Z-axis direction from the surface 121a, and the raw rubber powder is discharged onto the surface 121a.

The recoater 140 has a roller shape and is disposed on the surface 121a. The recoater 140 is connected at both axial ends to a drive mechanism (not illustrated) and can be moved while rolling in the X-axis direction. The recoater 140 can be separated from the surface 121a by a certain distance in the Z-axis direction, and this distance can be adjusted according to the thickness of the layer to be supplied onto the surface 121a. As illustrated in FIG. 4A, the axial length of the recoater 140 is larger than the longitudinal length of the opening in the surface 121a of the raw material supplier 130. The recoater 140 is not limited to a member having a roller shape or a rotating member and may, for example, be a plate-like member (blade).

In the additive manufacturing apparatus 100, the electron beam irradiation means 150 is arranged at a distance in the Z-axis direction with respect to the surface 111a. Although any electron beam irradiation means 150 can be used, at least one electron beam source 151 and an electron beam adjusting means 152 are preferably used.

The electron beam source 151 can be a thermal electron emission type electron gun. More specifically, for example, thermal electrons are generated by heating a cathode formed by tungsten, $LaB_6$, $CeB_6$, or the like, and an electron beam is generated by accelerating the thermal electrons.

The electron beam adjusting means 152 can, for example, include a magnetic field generator 152a and a focus controller 152b. Using the magnetic force of a permanent magnet, an electromagnet, or the like, the magnetic field generator 152a can adjust the convergence, deflection, and the like of the electron beam generated by the electron beam source 151. The focus controller 152b can also adjust the focus of the electron beam at the irradiation target using an optical lens, an electromagnetic lens, or the like. Although one electron beam source 151 is depicted in the illustrated example, a plurality of electron beam sources 151 may be included, each of which may be controlled under different irradiation conditions.

By being housed in a chamber (not illustrated) or the like, the additive manufacturing apparatus 100 can be used in a high vacuum environment during operation of the electron beam irradiation means 150.

Furthermore, the additive manufacturing apparatus 100 can be connected over a network to a control device 200. The control device 200 includes a hardware processor, such as a central processing unit, and includes a thin piece data acquisition interface 201 and a manufacturing controller 202.

The thin piece data acquisition interface 201 can acquire the data on the thin pieces necessary for manufacturing the rubber product 10.

The manufacturing controller 202 can control the additive manufacturing by providing instructions and information, via a network, to each component of the additive manufacturing apparatus 100 based on the data on the thin pieces. That is, the manufacturing controller 202 can control the operations of the manufacturing table 101, the recoater 140, the electron beam irradiation means 150, and the like, which configure the additive manufacturing apparatus 100.

Each of the steps from the thin piece data acquisition process S2 onwards in the method of manufacturing a rubber product according to the present embodiment will be described below in detail with an example using the additive manufacturing apparatus 100.

[Thin Piece Data Acquisition Step]

In the thin piece data acquisition step S2, the thin piece data on the rubber product 10, which is necessary for manufacturing the rubber product 10, is acquired by the thin piece data acquisition interface 201 of the control device 200.

The thin piece data can, for example, be acquired by converting three-dimensional manufacturing data on the rubber product 10. More specifically, the thin piece data acquisition interface 201 acquires the three-dimensional manufacturing data from an apparatus such as another computer that is connected to the control device 200 or that can transmit information to the control device 200. Here, the three-dimensional manufacturing data for manufacturing the rubber product 10 is, for example, three-dimensional manufacturing data designed by three-dimensional CAD, or three-dimensional manufacturing data captured by a three-dimensional scanner, digitizer, or the like. The three-dimensional manufacturing data may be converted into Standard Triangulated Language (STL) format, in which the surface of the three-dimensional rubber product 10 is represented as a collection of triangles. This three-dimensional manufacturing data on the rubber product 10 is acquired by the thin piece data acquisition interface 201 and converted into data on thin pieces L1 to LN (N is a natural number).

Three-dimensional manufacturing data may also be converted to thin piece data by an apparatus such as another computer that is connected to the control device 200 or is capable of transmitting information to the control device 200, and the thin piece data may then be acquired by the thin piece data acquisition interface 201.

[Preparation Step]

Next, the preparation step S3 will be described with reference to FIGS. 4A and 4B.

To start manufacturing based on the thin piece data, the manufacturing table 101 is set to a state in which the manufacturing of the rubber product can be started in the preparation step S3. That is, the relative positions of the surface 111a of the manufacturing unit 110 and the surface 121a of the supply plate 120 are adjusted to align the surface 111a with the surface 121a. In other words, the surface 111a and the surface 121a are arranged so that they extend to the same position and are substantially flush. Extending to the same position refers to being at the same position in the Z-axis direction and extending in the X-axis direction.

Of the two ends, in the X-axis direction, of the surface 121a of the supply plate 120, the recoater 140 is preferably arranged to be located at the end on the raw material supplier 130 side before the first raw rubber powder supply step S4.

A base material (not illustrated) made of a material that can be removed from the rubber product 10 may be disposed beforehand on the surface 111a of the manufacturing unit 110 so that the rubber product 10 can be easily removed from the surface 111a of the manufacturing unit 110 after all the steps are finished and the bonding of all the thin pieces is completed.

[First Raw Rubber Powder Supply Step]

Next, the first raw rubber powder supply step S4 will be described with reference to FIGS. 5A and 5B. In FIGS. 5A and 5B and subsequent figures, the control device 200 is omitted.

In the first raw rubber powder supply step S4, the raw rubber powder is supplied onto the surface of the manufacturing table 101 uniformly in a layer of a thickness corresponding to the thin piece L1.

In the example using the additive manufacturing apparatus 100, first, the raw rubber powder is stored in the raw material housing 131 of the raw material supplier 130, and the bottom portion 131b is raised by the raising/lowering mechanism 132 in a direction approaching the surface 121a in the Z-axis direction, so that an amount of raw rubber powder capable of forming a layer of a thickness corresponding to the thin piece L1 is disposed on the surface 121a of the supply plate 120. After the raw rubber powder is disposed on the surface 121a, the recoater 140 is rolled to pass over the surface of the manufacturing table 101, i.e., the surface 111a of the manufacturing unit 110 and the surface 121a of the supply plate 120, thereby supplying the raw rubber powder onto the surface 111a of the manufacturing unit 110 and the surface 121a of the supply plate 120 uniformly in a layer of a thickness corresponding to the thin piece L1 to form a raw rubber powder layer m1. At this time, it is essential that the recoater 140 be rolled while maintaining a distance, from the surface 111a of the manufacturing unit 110 and the surface 121a of the supply plate 120, of a thickness corresponding to the thin piece L1.

The thickness corresponding to the thin piece L1 can be controlled by the control device 200 based on the thin piece data. The thickness corresponding to the thin piece L1, that is, the thickness t1 of the raw rubber powder layer m1, can be adjusted according to the irradiation conditions of the electron beam described below, the average particle size of the raw rubber powder, and the like, but is preferably 500 μm or less for uniform crosslinking over the thickness direction.

[First Crosslinking Step]

Next, the first crosslinking step S5 will be described with reference to FIGS. 6A and 6B.

In the first crosslinking step S5, the raw rubber powder layer m1 formed by the first raw rubber powder supply step S4 is irradiated with an electron beam according to a shape corresponding to the thin piece L1 to crosslink the irradiated portion.

The electron beam irradiation means is not particularly limited, but the electron beam irradiation means 150, for example, can be used. The electron beam generated by the electron beam source 151 of the electron beam irradiation means 150 is converged and deflected by the magnetic field generator 152a, and the irradiation position is moved based on the thin piece data to scan the raw rubber powder layer m1. Furthermore, the focus controller 152b enables adjustment of the position where the electron beam achieves just focus, i.e., the focus.

When the raw rubber powder layer m1 is irradiated with the electron beam, the rubber molecules of the raw rubber powder are provided with energy by high-speed electrons. The high-speed electrons cleave the molecular bonds, which generates radicals, and the radicals react between molecular chains to form a three-dimensional structure, yielding a crosslinking reaction.

According to the electron beam crosslinking means, the location to be crosslinked can be changed by controlling the position where the electron beam is irradiated, thus eliminating the need to prepare a mold and other such hassle, and enabling a flexible response to changes in product shape. Furthermore, a high manufacturing accuracy can be achieved. Rubber products with complex shapes that are difficult to remove from a mold, or that cannot be manufactured with a mold, can also be manufactured.

The irradiation conditions of the electron beam can be controlled by the control device 200 based on the thin piece data on the rubber product 10 that is to be manufactured. The specific irradiation conditions of the electron beam can be adjusted appropriately according to factors such as the thickness of the raw rubber powder layer and the average diameter of the raw rubber powder.

For example, the focusing of the electron beam is preferably set to achieve just focus on the surface of the raw rubber powder layer to generate a sufficient crosslinking reaction in the rubber.

Although the temperature at the time of electron beam irradiation is not particularly limited, the first crosslinking step S5 is preferably performed in a temperature environment lower than the melting point of the rubber. According to the above configuration, the crosslinking reaction can be produced at a lower temperature than with means for vulcanizing rubber by heating. Bubbles that might be generated in the rubber by heating can therefore be suppressed, and cracks or tears can be prevented from occurring at the areas with bubbles.

Furthermore, the electron beam irradiation is preferably performed in a high vacuum environment to prevent deactivation of the radicals by oxygen. For example, when the additive manufacturing apparatus 100 is housed in a chamber or the like, a high vacuum is created in the chamber.

Figure 6A:
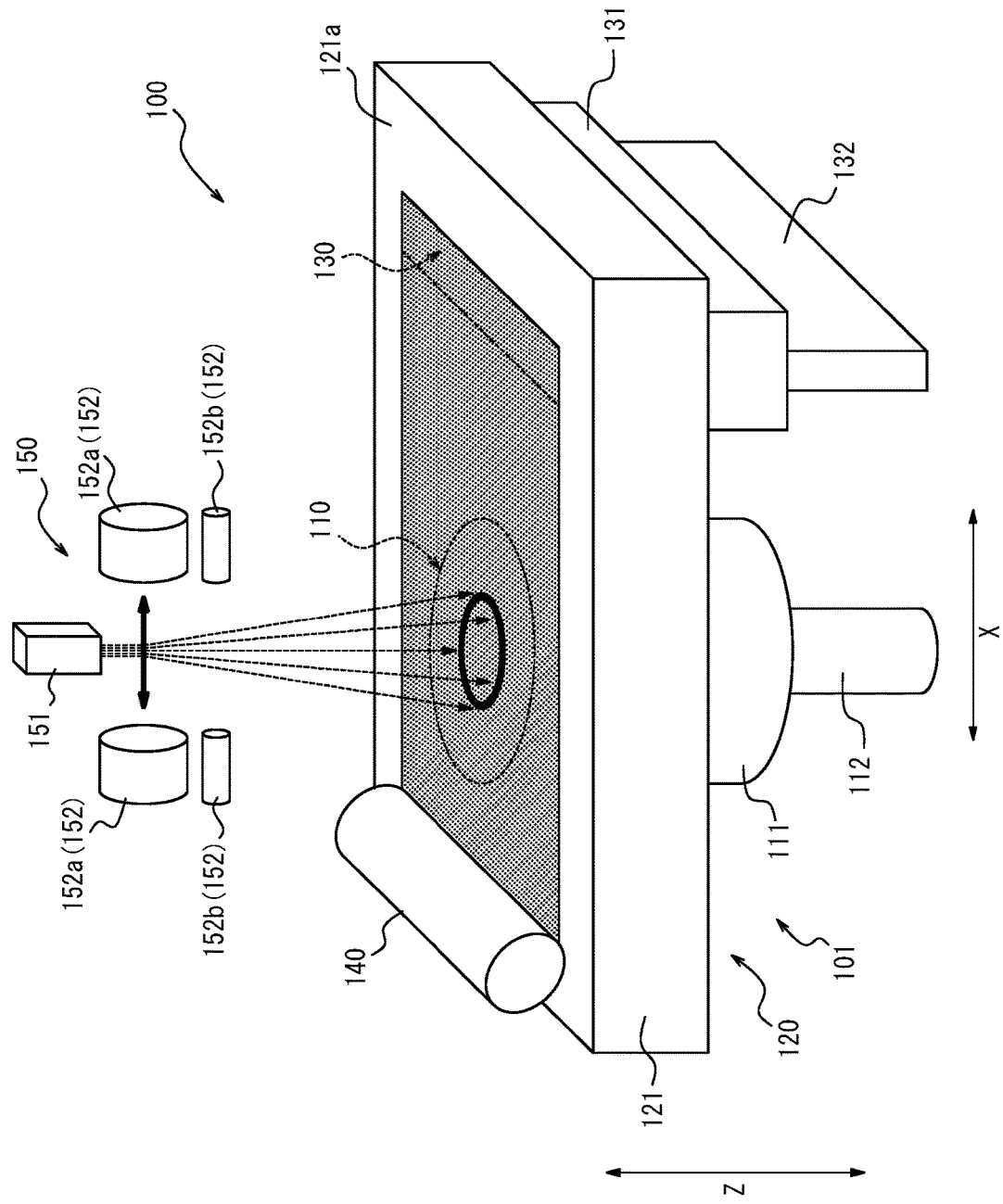
FIG. 6A is a perspective view schematically illustrating a first cross-linking process.

By the first crosslinking step S5, a crosslinked portion M1 can be formed in the raw rubber powder layer m1 as illustrated in FIGS. 6A and 6B. In the illustrated example, a ring-shaped crosslinked portion M1 is formed, corresponding to the thin piece L1 of the rubber product 10.

[Post-Treatment Step]

The post-treatment step S6 after the first crosslinking step S5 will be described with reference to FIGS. 7A and 7B. In the post-treatment step S6, after the first crosslinking step S5, the relative positions of the surface of the crosslinked portion M1 in the raw rubber powder layer m1 and the surface of the manufacturing table 101 are adjusted to align the surface of the crosslinked portion M1 with the surface of the manufacturing table 101. That is, in the illustrated example, the relative positions in the Z-axis direction of the surface of the crosslinked portion M1 and the surface 121a of the supply plate 120 are adjusted to align the surface of the crosslinked portion M1 with the surface 121a of the supply plate 120. To adjust the relative positions, the manufacturing unit 110 can be lowered, by the thickness of the crosslinked portion M1 of the raw rubber powder layer m1, away from the surface 121a in the Z-axis direction using the raising/lowering mechanism 112, for example, to align the surface of the crosslinked portion M1 with the surface 121a of the supply plate 120.

The relative positions of the surface of the crosslinked portion M1 and the surface 121a of the supply plate 120 may be adjusted by raising and lowering the supply plate 120 relative to the manufacturing unit 110.

Before or after the post-treatment step S6, a step of removing the uncrosslinked raw rubber powder remaining on the surface 121a of the supply plate 120 may be provided. The means for removing the uncrosslinked raw rubber powder is not particularly limited, but suction means, for example, may be used. Alternatively, a collection hole (not illustrated) opening to the surface 121a may be provided on the outer periphery of the manufacturing unit 110 in the supply plate 120, and the uncrosslinked raw rubber powder may swept by a brush or blown by air to the collection hole and removed. A passage connecting the collection hole to the raw material housing 131 may be formed to reuse the uncrosslinked raw rubber powder in a subsequent step.

[Second Raw Rubber Powder Supply Step]

Figure 8A:
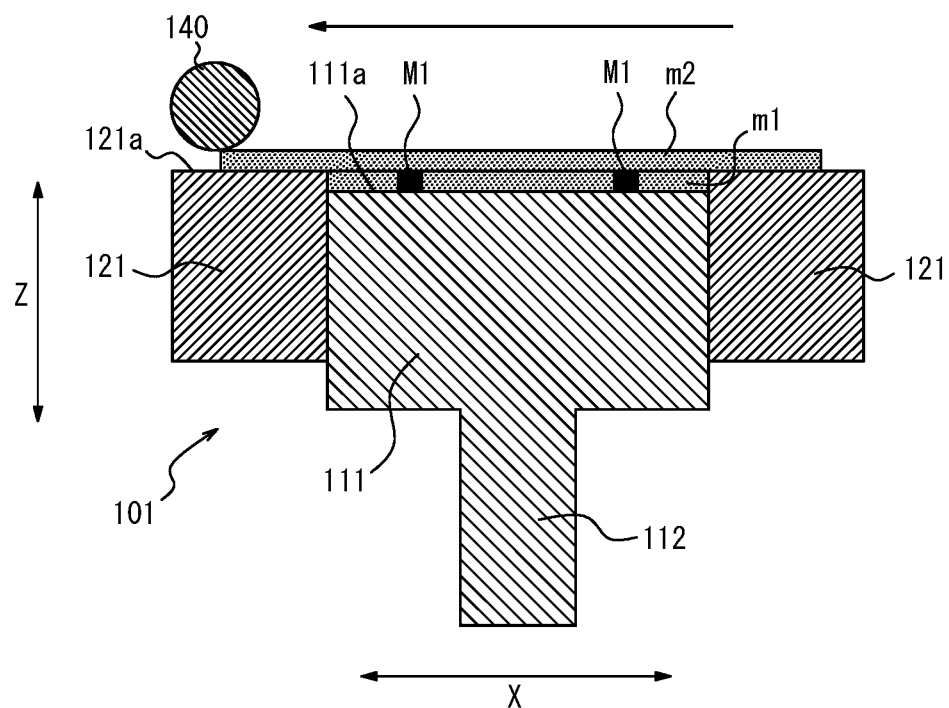
FIG. 8A is a cross-sectional view schematically illustrating a second raw rubber powder supply process.

The second raw rubber powder supply step S7 will be described with reference to FIG. 8A. FIG. 8A is a schematic cross-sectional view illustrating the second raw rubber powder supply step S7 and schematically illustrates the manufacturing table 101, the recoater 140, and the raw rubber powder layer m1.

In the second raw rubber powder supply step S7, the raw rubber powder is supplied onto the surface of the manufacturing table 101 including the surface of the crosslinked portion M1, i.e., the surface of the crosslinked portion M1, the surface of the raw rubber powder layer m1, and the surface 121a of the supply plate 120, uniformly in a layer of a thickness corresponding to the next thin piece L2 to be stacked on the thin piece L1.

As in the first raw rubber powder supply step, first, the bottom portion 131b of the raw material housing 131 is raised by the raising/lowering mechanism 132 in a direction approaching the surface 121a in the Z-axis direction, so that an amount of raw rubber powder capable of forming a layer of a thickness corresponding to the thin piece L2 is disposed on the surface 121a of the supply plate 120. After the raw rubber powder is disposed on the surface 121a, the recoater 140 is rolled to pass over the surface 121a of the supply plate 120 and the surface of the crosslinked portion M1 to supply the raw rubber powder onto the surface of the crosslinked portion M1 as a raw rubber powder layer m2. At this time, it is essential that the recoater 140 be rolled while maintaining a distance, from the surface 121a of the supply plate 120 and the surface of the crosslinked portion M1, of a thickness corresponding to the thin piece L2. In the illustrated example, the raw rubber powder layer m2 is supplied on the crosslinked portion M1, the raw rubber powder layer m1 containing the crosslinked portion M1, and the surface 120a of the supply plate 120.

The layer of a thickness corresponding to the thin piece L2 can be controlled by the control device 200 based on the thin piece data.

[Second Crosslinking Step]

Figure 8B:
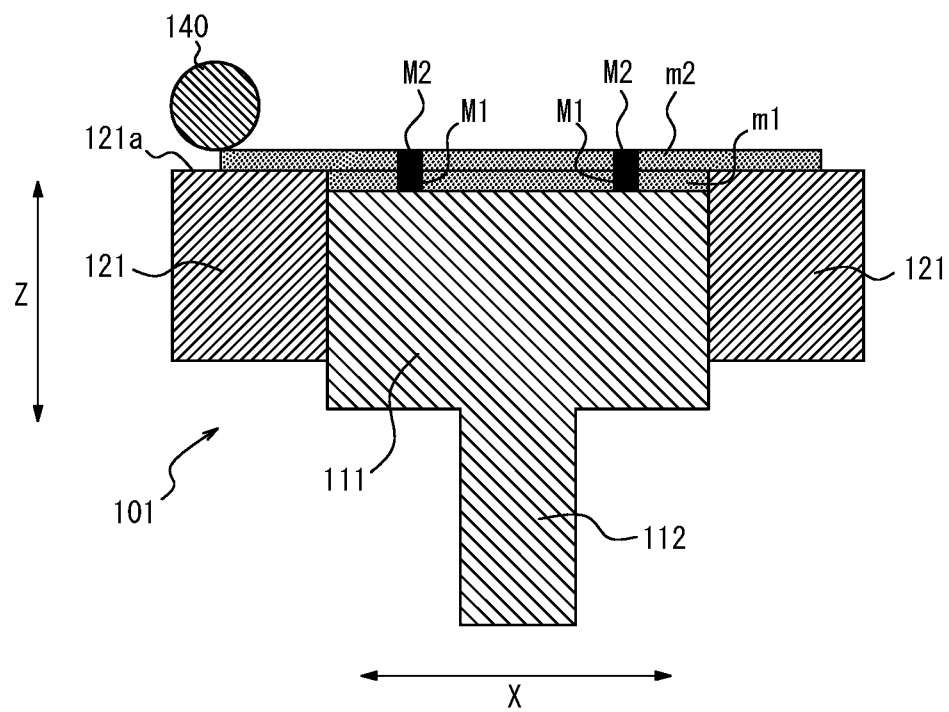
FIG. 8B is a cross-sectional view schematically illustrating a second cross-linking process.

Next, the second crosslinking step S8 will be described with reference to FIG. 8B. In the second crosslinking step S8, the raw rubber powder layer m2 formed by the second raw rubber powder supply step S7 is irradiated with an electron beam according to a shape corresponding to the next thin piece L2 to crosslink the irradiated portion.

The electron beam irradiation means 150, for example, can be used for the electron beam irradiation. The electron beam generated by the electron beam source 151 of the electron beam irradiation means 150 is converged and deflected by the magnetic field generator 152a, and the irradiation position is moved based on the thin piece data to scan the raw rubber powder layer. Furthermore, the focus controller 152b enables adjustment of the position where the electron beam achieves just focus, i.e., the focus.

The irradiation conditions of the electron beam may be the same as the irradiation conditions in the first crosslinking step S5, or may be different.

For example, in the first crosslinking step S5, the focusing of the electron beam may be controlled so that the electron beam achieves just focus on the surface of the raw rubber powder layer, and in the second irradiation step, a plurality of electron beam supply sources may be used and the electron beams controlled to achieve just focus on the surface of the raw rubber powder layer and on the boundary with the adjacent raw rubber powder layer immediately below the raw rubber powder layer. According to the above configuration, the raw rubber powder layer can be sufficiently crosslinked, and the crosslinked portions M1 and M2 of the adjacent raw rubber powder layers m1 and m2 can be bonded together.

The focusing of the electron beam can be controlled so that the focusing is always the same, or the focusing can be changed.

In the second crosslinking step S8, although the temperature at the time of electron beam irradiation is not particularly limited, the crosslinking is preferably performed in a temperature environment lower than the melting point of the rubber, as in the first crosslinking step S5. According to the above configuration, the manufacturing accuracy can be further enhanced, and deterioration of the rubber product due to heating can be prevented.

The second crosslinking step S8 enables the formation of a crosslinked portion, in the raw rubber powder layer, corresponding to the next thin piece. In FIG. 8B, the crosslinked portion M2, which is a ring-shaped layer corresponding to the thin piece L2 in the second layer from the bottom in the Z-axis direction of the rubber product 10, is stacked onto and bonded to the crosslinked portion M1.

After the second crosslinking step S8 is performed, the post-treatment step S6, the second powder supply step S7, and the second crosslinking step S8 are sequentially repeated to bond the plurality of thin pieces together.

Figure 8C:
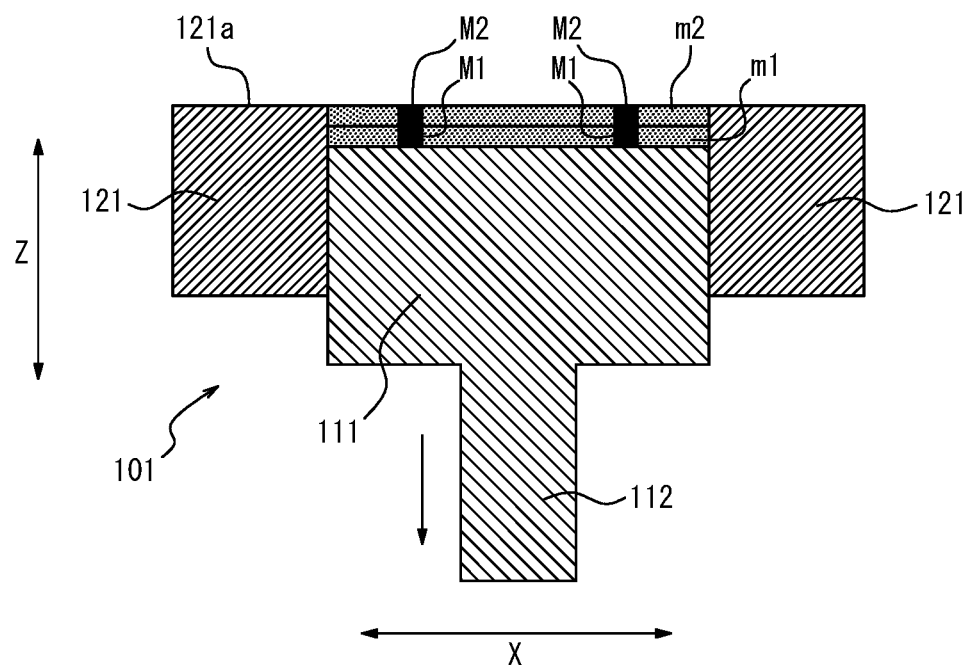
FIG. 8C is a cross-sectional view schematically illustrating a post-treatment process.

That is, after the second crosslinking step S8, as illustrated in FIG. 8C, the relative positions of the surface of the crosslinked portion M2 in the raw rubber powder layer m2 and the surface of the manufacturing table 101 are adjusted to align the surface of the crosslinked portion M2 with the surface of the manufacturing table 101. In other words, in the illustrated example, the relative positions in the Z-axis direction of the surface of the crosslinked portion M2 and the surface 121a of the supply plate 120 are adjusted to align the surface of the crosslinked portion M2 with the surface 121a of the supply plate 120.

Figure 8D:
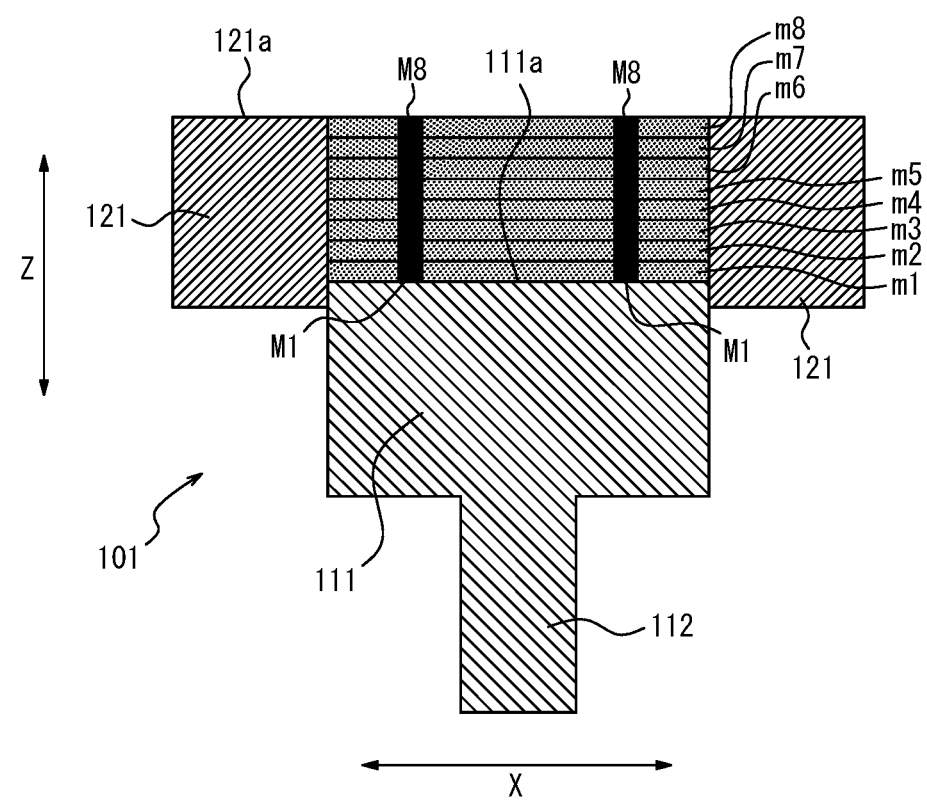
FIG. 8D is a diagram illustrating a state in which a plurality of raw rubber powder layers are stacked.

After the surface of the crosslinked portion M2 and the surface 121a of the supply plate 120 are aligned, the raw rubber powder is supplied onto the surface of the raw rubber powder layer m2, which is at the same position in the Z-axis direction as the surface 121a of the supply plate 120, uniformly in a layer of a thickness corresponding to the next thin piece L3. The layer is then irradiated with an electron beam according to a shape corresponding to the next thin piece L3 to crosslink the irradiated portion. The raw rubber powder layer can thus be sufficiently crosslinked, and the crosslinked portions of the adjacent raw rubber powder layers can be bonded together. FIG. 8D illustrates a state in which raw rubber powder layers m1 to m8 are stacked and aligned after a crosslinked portion M8 is formed by electron beam irradiation of the raw rubber powder layer m8. In this way, by repetition of the post-treatment step S6, the second raw rubber powder supply step S7, and the second crosslinking step S8, a rubber product 10 having a plurality of thin pieces L1 to LN bonded together is manufactured.

The method of manufacturing a rubber product including each of the above steps S1 to S8 can flexibly respond to changes in the shape of the product and achieve high manufacturing accuracy.

After the last layer in the Z-axis direction is crosslinked, a step of removing the rubber product 10 from the surface 111a of the manufacturing unit 110 and removing the uncrosslinked raw rubber powder remaining at the outer and inner periphery of the rubber product 10 is preferably included.

The means for removing the uncrosslinked raw rubber powder is not particularly limited, but the powder can, for example, be removed by blowing water or air onto the rubber product 10.

Figure 9:
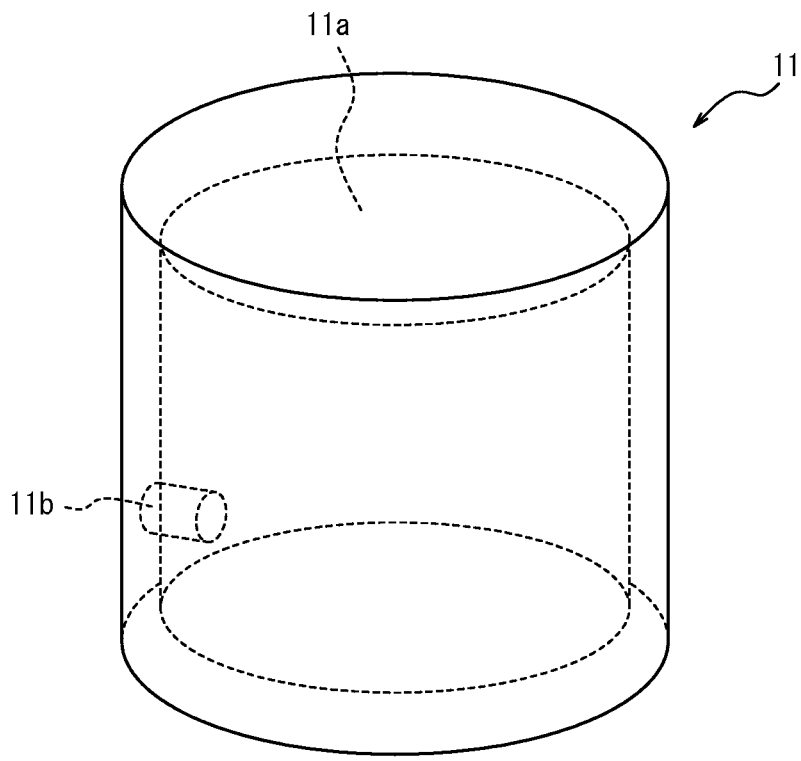
FIG. 9 is a perspective view transparently illustrating another example of a rubber product manufactured by the method of manufacturing a rubber product according to an embodiment of the present disclosure.

Another example of the rubber product is a rubber product 11 having a shape such that a cylindrical hollow 11a is formed inside a cylinder, with a hole 11b penetrating from the hollow 11a to the outer periphery of the cylinder, as illustrated in FIG. 9. After crosslinking to yield the shape of the rubber product 11 by steps S1 to S8, the uncrosslinked raw rubber powder remaining in the hollow 11a can be discharged from the hole 11b. At this time, after the uncrosslinked raw rubber powder is discharged from the hole 11b, the hole 11b may be plugged with another crosslinked rubber material. In this way, a hollow rubber product can be easily formed.

Figure 10:
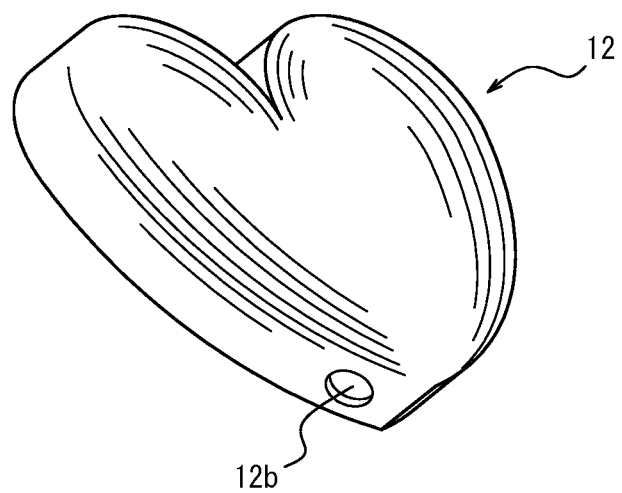
FIG. 10 is a perspective view transparently illustrating yet another example of a rubber product manufactured by the method of manufacturing a rubber product according to an embodiment of the present disclosure.

Another example of the rubber product is a rubber product 12 having a shape such that the entire outer periphery is curved, a hollow is formed inside, and a hole 12b penetrates from the hollow to the outer periphery, as illustrated in FIG. 10. After crosslinking to yield the shape of the rubber product 12 by steps S1 to S8, the uncrosslinked raw rubber powder remaining inside can be discharged from the hole 12b. At this time, after the uncrosslinked raw rubber powder is discharged from the hole 12b, the hole 12b may be plugged with another crosslinked rubber material. In this way, a hollow rubber product can be easily formed.

INDUSTRIAL APPLICABILITY

The method of manufacturing a rubber product of the present disclosure can be suitably applied to the manufacturing of rubber products such as anti-vibration rubber, seismic isolation rubber, tires, and tire treads.

REFERENCE SIGNS LIST 10, 11, 12 Rubber product
100 Additive manufacturing apparatus
101 Manufacturing table
110 Manufacturing unit
111 Manufacturing base
111a Surface
112 Raising/lowering mechanism
120 Supply plate
121 Plate-like portion
121a Surface
130 Raw material supplier
131 Raw material housing
131b Bottom portion
132 Raising/lowering mechanism
140 Recoater
150 Electron beam irradiation means
151 Electron beam source
152 Electron beam adjusting means
152a Magnetic field generator
152b Focus controller
200 Control device
201 Thin piece data acquisition interface
202 Manufacturing controller
L1, L2, L3 Thin piece
m1, m2, m3, m4, m5, m6, m7, m8 Raw rubber powder layer
M1, M2, M8 Crosslinked portion

The invention claimed is:

1. A method of manufacturing a rubber product by bonding a plurality of thin pieces on a manufacturing table, the method comprising:
an adhesion prevention treatment step of treating uncrosslinked rubber powder, which is a material of the rubber product, to prevent mutual adhesion of the uncrosslinked rubber powder;
a first raw rubber powder supply step of supplying raw rubber powder, on which the adhesion prevention treatment has been performed, onto a surface of the manufacturing table uniformly in a layer of a thickness corresponding to a thin piece;
a first crosslinking step of irradiating a portion of the layer of raw rubber powder with an electron beam according to a shape corresponding to the thin piece to crosslink the portion that is irradiated;
a post-treatment step of adjusting relative positions of a surface of a crosslinked portion in the layer of raw rubber powder and a surface of the manufacturing table to align the surface of the crosslinked portion with the surface of the manufacturing table;
a second raw rubber powder supply step of supplying the raw rubber powder onto the surface of the manufacturing table, including the surface of the crosslinked portion, uniformly in a layer of a thickness corresponding to a next thin piece to be stacked on the thin piece; and
a second crosslinking step of irradiating a portion of the layer of raw rubber powder with an electron beam according to a shape corresponding to the next thin piece to crosslink the portion that is irradiated,
wherein the post-treatment step, the second raw rubber powder supply step, and the second crosslinking step are sequentially repeated to bond the plurality of thin pieces together.

2. The method of manufacturing a rubber product of claim 1, wherein the crosslinking step is performed in a temperature environment lower than a melting point of rubber.

3. The method of manufacturing a rubber product of claim 1, wherein the uncrosslinked rubber powder includes calcium oxide.

4. The method of manufacturing a rubber product of claim 2, wherein the uncrosslinked rubber powder includes calcium oxide.

* * * * *